US012128426B2

(12) United States Patent
Höglund

(10) Patent No.: US 12,128,426 B2
(45) Date of Patent: Oct. 29, 2024

(54) MODULAR CENTRIFUGAL SEPARATOR AND BASE UNIT THEREOF AND SYSTEM

(71) Applicant: Alfa Laval Corporate AB, Lund (SE)

(72) Inventor: Kasper Höglund, Rönninge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 766 days.

(21) Appl. No.: 17/296,682

(22) PCT Filed: Dec. 9, 2019

(86) PCT No.: PCT/EP2019/084141

§ 371 (c)(1),
(2) Date: May 25, 2021

(87) PCT Pub. No.: WO2020/120359

PCT Pub. Date: Jun. 18, 2020

(65) Prior Publication Data

US 2022/0023889 A1 Jan. 27, 2022

(30) Foreign Application Priority Data

Dec. 10, 2018 (EP) .................................... 18211242

(51) Int. Cl.
*B04B 7/14* (2006.01)
*B04B 9/02* (2006.01)
(Continued)

(52) U.S. Cl.
CPC .................. *B04B 7/14* (2013.01); *B04B 9/02* (2013.01); *B04B 11/02* (2013.01); *B04B 9/08* (2013.01); *B04B 9/12* (2013.01)

(58) Field of Classification Search
CPC .. B04B 7/14; B04B 9/02; B04B 11/02; B04B 9/08; B04B 9/12; B04B 7/08; B04B 7/12
See application file for complete search history.

(56) References Cited

U.S. PATENT DOCUMENTS 2,104,683 A 1/1938 Rosen et al.
3,602,425 A 8/1971 Schmidt
(Continued)

FOREIGN PATENT DOCUMENTS

CN 102892512 A 1/2013
CN 102921563 A 2/2013
(Continued)

OTHER PUBLICATIONS

Translation of Chinese Office Action and Search Report for Chinese Application No. 201980081548.4, dated Jul. 20, 2022.
(Continued)

*Primary Examiner* — Walter D. Griffin
*Assistant Examiner* — Shuyi S. Liu
(74) *Attorney, Agent, or Firm* — Birch, Stewart, Kolasch & Birch, LLP

(57) ABSTRACT

A base unit and a modular centrifugal separator are disclosed. The base unit includes a stationary frame, a rotatable member, and a drive unit. The rotatable member delimits an inner space being configured for receiving at least one part of an exchangeable separation insert therein. The rotatable member is provided with a first opening at a first axial end configured for a first fluid connection of the exchangeable separation insert to extend through the first opening. The rotatable member includes a second opening at a second axial end configured for a second fluid connection of the exchangeable separation insert to extend through the second opening.

19 Claims, 4 Drawing Sheets

(51) Int. Cl.

| | |
|---|---|
| ***B04B 11/02*** | (2006.01) |
| *B04B 9/08* | (2006.01) |
| *B04B 9/12* | (2006.01) |

(56) References Cited

U.S. PATENT DOCUMENTS

| | | | | |
|---|---|---|---|---|
| 6,439,577 | B2 | 8/2002 | Jorgensen et al. | |
| 6,709,377 | B1 | 3/2004 | Rochat | |
| 6,821,319 | B1 | 11/2004 | Moberg et al. | |
| 7,037,428 | B1 | 5/2006 | Robinson et al. | |
| 2011/0195832 | A1* | 8/2011 | Rudman | B04B 7/14 494/67 |
| 2011/0319248 | A1* | 12/2011 | Starbard | B04B 1/08 494/45 |
| 2016/0184836 | A1 | 6/2016 | Mackel et al. | |
| 2017/0189915 | A1 | 7/2017 | Mackel et al. | |
| 2017/0203306 | A1* | 7/2017 | Penkl | B04B 11/02 |
| 2018/0147581 | A1 | 5/2018 | Quiter et al. | |
| 2019/0283045 | A1* | 9/2019 | Kessler | B04B 11/082 |

FOREIGN PATENT DOCUMENTS

| | | | | | |
|---|---|---|---|---|---|
| CN | 103945949 | A | | 7/2014 | |
| CN | 106413906 | A | | 2/2017 | |
| CN | 107855226 | A | | 3/2018 | |
| DE | 10 2009 053 660 | B3 | | 5/2011 | |
| EA | 201200206 | A1 | | 9/2012 | |
| EP | 3384993 | A1 | * | 10/2018 | B04B 1/08 |
| KR | 10-2011-0063558 | A | | 6/2011 | |
| WO | WO-03095720 | A1 | * | 11/2003 | C03B 37/055 |
| WO | WO 2008/106409 | A1 | | 9/2008 | |
| WO | WO 2010/033075 | A1 | | 3/2010 | |
| WO | WO 2011/011862 | A1 | | 2/2011 | |
| WO | WO 2011/119088 | A1 | | 9/2011 | |
| WO | WO 2013/078194 | A2 | | 6/2013 | |
| WO | WO 2014/000829 | A1 | | 1/2014 | |
| WO | WO 2015/181175 | A2 | | 12/2015 | |
| WO | WO 2015/181177 | A1 | | 12/2015 | |
| WO | WO 2016/192927 | A1 | | 12/2016 | |

OTHER PUBLICATIONS

International Search Report, issued in PCT/EP2019/084141, dated Jan. 17, 2020.

Written Opinion of the International Searching Authority, issued in PCT/EP2019/084141, dated Jan. 17, 2020.

Korean Office Action for Korean Application No. 10-2021-7021221, dated Jan. 16, 2023, with English translation.

* cited by examiner

MODULAR CENTRIFUGAL SEPARATOR AND BASE UNIT THEREOF AND SYSTEM

TECHNICAL FIELD

The invention relates to a base unit of a modular centrifugal separator. The invention further relates to a modular centrifugal separator. The invention also relates to a system for separating a cell culture mixture.

BACKGROUND

In the field of pharmaceuticals, biopharmaceuticals, biotechnology and thereto related fields, separation of substances from a liquid mixture, such as separation of cells from a cell culture mixture, are performed in a sterile environment. Traditionally, equipment made e.g. from stainless steel has been used, which equipment is sterilised between batches.

Lately, disposable separation equipment made for single use, i.e. for one batch or a limited number of batches, has been suggested. For instance, US2011/0319248 discloses a single use centrifuge and WO 2015/181177 discloses a separator comprising an exchangeable inner drum.

Such disposable separation equipment is supplied to the user in a sterile manner. Thus, a sterile environment for the product in the separator may be provided without sterilisation of the separation equipment at the production facility of the user.

WO 2015/181177 discloses a separator for the centrifugal processing of a flowable product comprising a rotatable outer drum and an exchangeable inner drum arranged in the outer drum. The inner drum comprises means for clarifying the flowable product. The outer drum is driven via a drive spindle by a motor arranged below the outer drum. The inner drum extends vertically upwardly through the outer drum with fluid connections arranged at an upper end of the separator.

SUMMARY

It is an object of the invention to provide for an easy replacement of an exchangeable separation insert in a modular centrifugal separator.

According to an aspect of the invention, there is provided a base unit of a modular centrifugal separator configured for separating a liquid feed mixture into a heavy phase and a light phase, the modular centrifugal separator comprising the base unit and an exchangeable separation insert, the exchangeable separation insert being configured to form the only part of the modular centrifugal separator, which is in contact with the liquid feed mixture, and the separated heavy and light phases. The base unit comprises a stationary frame, a rotatable member configured to rotate about an axis of rotation arranged in the stationary frame, and a drive unit for rotating the rotatable member about the axis of rotation. The rotatable member has a first axial end and a second axial end, and delimits an inner space at least in a radial direction, the inner space being configured for receiving at least one part of the exchangeable separation insert therein, such that portions of the rotatable member delimiting the inner space are fully separate from the liquid feed mixture, and the separated heavy and light phases during use of the modular centrifugal separator. The rotatable member is provided with a first opening at the first axial end configured for a first fluid connection of the exchangeable separation insert to extend through the first opening. The rotatable member further is provided with a second opening at the second axial end configured for a second fluid connection of the exchangeable separation insert to extend through the second opening.

Since the rotatable member is provided with the first opening at the first axial end and the second opening at the second axial end, each of first and second fluid connections of the exchangeable separation insert can be arranged to extend through respective of the first and second openings. Thus, the exchangeable separation insert is easily mountable in the rotatable member of the base unit. As a result, the above mentioned object is achieved.

Moreover, since the first and second fluid connections of the exchangeable separation insert will be arranged at opposite ends of the rotatable member of the base unit, mistakes related to the connection of the first and second fluid connections to equipment external of the modular centrifugal separator can be avoided.

According to a further aspect of the invention, there is provided a modular centrifugal separator configured for separating a liquid feed mixture into a heavy phase and a light phase, the modular centrifugal separator comprising a base unit and an exchangeable separation insert, the exchangeable separation insert being configured to form the only part of the modular centrifugal separator, which is in contact with the liquid feed mixture, and the separated heavy and light phases. The exchangeable separation insert comprises a rotor casing forming a separation space, frustoconical separation discs arranged in the separation space, and fluid connections for the liquid feed mixture, the heavy phase and the light phase. The modular centrifugal separator comprises a base unit according to any one of aspects and/or embodiments discussed herein.

As discussed above, due to the provision of the first and second openings at opposite axial ends of the rotatable member of the base unit, the exchangeable separation insert is easily mountable in the rotatable member of the base unit with fluid connections extending out of the rotatable member at both axial ends thereof.

The modular centrifugal separator may comprise two main parts, the base unit and the exchangeable separation insert. The base unit may comprise basic components for supporting and rotating the exchangeable separation insert. The exchangeable separation insert may be configured for the actual separation of the liquid feed mixture to take place in the separation space thereof. The liquid feed mixture may flow through one fluid connection into the separation space and the separated heavy and light phases may leave the separation space via one fluid connection each.

The exchangeable separation insert may be configured for single use, i.e. for separation of one batch only or a limited number of batches of liquid feed mixture. The base unit on the other hand may be configured for repeated use with different exchangeable separation inserts, i.e. the base unit may be used for the separation of numerous batches of liquid feed mixture using different exchangeable separation inserts.

The exchangeable separation insert may be configured to form the only part of the modular centrifugal separator, which is in contact with the liquid feed mixture, and the separated heavy and light phases. Thus, the exchangeable separation insert may be provided to a user as a sterile entity. The sterile entity may include parts configured for separating the liquid feed mixture as well as conduits for the liquid feed mixture and the separated heavy and light phases. The exchangeable separation insert is mounted in the base unit by the user. Thus, the user will readily have available a centrifugal separator with a sterile environment for separation of the liquid feed mixture.

As understood from the discussion above, and that the exchangeable separation insert is configured to form the only part of the modular centrifugal separator, which is in contact with the liquid feed mixture, and the separated heavy and light phases, this entails that portions of the rotatable member delimiting the inner space are fully separate from the liquid feed mixture, and the separated heavy and light phases during use of the modular centrifugal separator.

The rotatable member of the base unit may be rotatably supported in the stationary frame. The rotatable member may be supported in the stationary frame without the aid of a spindle or other kind of rotor shaft, for instance a bearing may extend around the rotatable member and support it in the stationary frame.

The stationary frame is stationary in the sense that it is stationary during use of modular centrifugal separator.

The exchangeable separation insert may comprise the rotor casing, a first stationary portion provided with a first conduit portion, and a second stationary portion provided with a second conduit portion. When the exchangeable separation insert is mounted in the base unit, the at least one part of the exchangeable separation insert received in the inner space of the rotatable member may be the rotor casing. At least part of the first stationary portion may extend through the first opening of the rotatable member and at least part of the second stationary portion may extend through the second opening of the rotatable member.

As understood from the discussion above, during use of the modular centrifugal separator, the rotatable member does not come into contact with any of the liquid feed mixture, and the heavy and light phases. Instead the liquid feed mixture, and the heavy and light phases are in contact with an interior of the exchangeable separation insert. Thus, portions of the rotatable member delimiting the inner space of the rotatable member are dry during use of the modular centrifugal separator.

According to embodiments, the base unit may comprise at least one bearing. The rotatable member may be journalled in the stationary frame via the at least one bearing. In this manner, the rotatable member which delimits therein the inner space configured for receiving the at least one part of the exchangeable separation insert is journalled in the stationary frame. Thus, no spindle or shaft is required for journaling the rotatable member, and a compact rotor in the form of the rotatable member and the at least one part of the exchangeable separation insert is provided in the modular centrifugal separator.

According to embodiments, the at least one bearing may be arranged at an axial position along the axis of rotation such that the at least one bearing extends around a portion of the inner space delimited by the rotatable member. In this manner, the rotatable member may be supported at an axial position where the at least one part of the exchangeable separation insert is arranged inside the rotatable member. Thus, the rotatable member may be supported providing good balance during rotation of the rotatable member.

According to embodiments, the rotatable member may comprise a frustoconical wall member having an imaginary apex in a region of the second end. In this manner, a portion of the exchangeable separation insert, having a conical or frustoconical shape, may be readily supported in the inner space of the rotatable member.

According to embodiments, the rotatable member may comprise a rotor body and a cap. The first opening may be arranged in the cap. The cap may be releasably engaged with the rotor body for providing access to the inner space and mounting of the exchangeable separation insert. In this manner, the cap may be released from the rotor body in order to mount the exchangeable separation insert in the inner space of the rotatable member. Since the first opening is provided in the cap, the first fluid connection of the exchangeable separation insert may be arranged to extend through the first opening after the exchangeable separation insert has been arranged in the inner space and when the cap is engaged with the rotor body. Suitably, as the cap is engaged with the rotor body, the rotor casing of the exchangeable separation insert is secured inside the rotatable member.

According to embodiments, the stationary frame may comprise a housing. The rotatable member may be arranged inside the housing. The housing may comprise a lid provided with a third opening. In an open position of the lid access may be provided to the rotatable member for exchange of the exchangeable separation insert, and in a closed position of the lid the third opening may be configured for the first fluid connection of the exchangeable separation insert to extend therethrough. In this manner, the rotatable member is protected by the housing during use of the modular centrifugal separator, while at the same time a user of the modular centrifugal separator cannot access the rotatable member when the lid is closed. Thus, the user is prevented from reaching the rotatable member when it rotates during use of the modular centrifugal separator. Personal safety may thus be ensured. Since the lid is provided with the third opening, the first fluid connection of the exchangeable separation insert may be arranged to extend through the third opening thus, permitting fluid to leave or enter the separation space within the rotor casing of the exchangeable separation insert.

According to embodiments, the lid may be configured to engage with a portion of the exchangeable separation insert. In this manner, it may be ensured that the portion of the exchangeable separation insert is maintained in a predefined position during use of the modular centrifugal separator. Moreover, the portion of the exchangeable separation insert may be maintained fixed in relation to the stationary frame and the base unit. The predefined position may be a predefined axial position along the axis of rotation and/or a predefined angular position, i.e. a predefined position about the axis of rotation.

According to embodiments, the stationary frame may comprise a fourth opening opposite to the lid: The fourth opening may be configured for the second fluid connection of the exchangeable separation insert to extend therethrough. In this manner, the second fluid connection may extend from the rotatable member out of the stationary frame. The fourth opening may be provided in the housing, which forms part of the stationary frame.

According to embodiments, the base unit may comprise an engagement member arranged at the fourth opening, wherein the engagement member is configured to engage with a portion of the exchangeable separation insert. In this manner, it may be ensured that the portion of the exchangeable separation insert at the fourth opening is maintained in a predefined position during use of the modular centrifugal separator. Moreover, the portion of the exchangeable separation insert may be maintained fixed in relation to the stationary frame and the base unit. The predefined position may be a predefined axial position along the axis of rotation and/or a predefined angular position, i.e. a predefined position about the axis of rotation.

According to embodiments, the stationary frame may comprise a protruding member, and the housing may be connected to the protruding member such that access is provided at least to one end of the housing along the axis of rotation. In this manner, a user may readily install the exchangeable separation insert in the rotatable member.

According to embodiments, the drive unit may comprise an electric motor, and a transmission arranged between the electric motor and the rotatable member. In this manner, the electric motor may be arranged beside the rotatable member. Thus, access may be provided along the axis of rotation, e.g. to the housing and/or the rotatable member.

According to a further aspect of the invention, there is provided a system for separating a cell culture mixture, comprising a fermenter tank, a modular centrifugal separator according to any one of aspects and/or embodiments discussed herein, and a conduit connection extending between the fermenter tank and the modular centrifugal separator, wherein the conduit connection comprises the second fluid connection of the exchangeable separation insert.

Since the system comprises the modular centrifugal separator as discussed herein, and due to the provision of the first and second openings at opposite axial ends of the rotatable member of the base unit of the modular centrifugal separator, the exchangeable separation insert is easily mountable in the modular centrifugal separator of the system.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
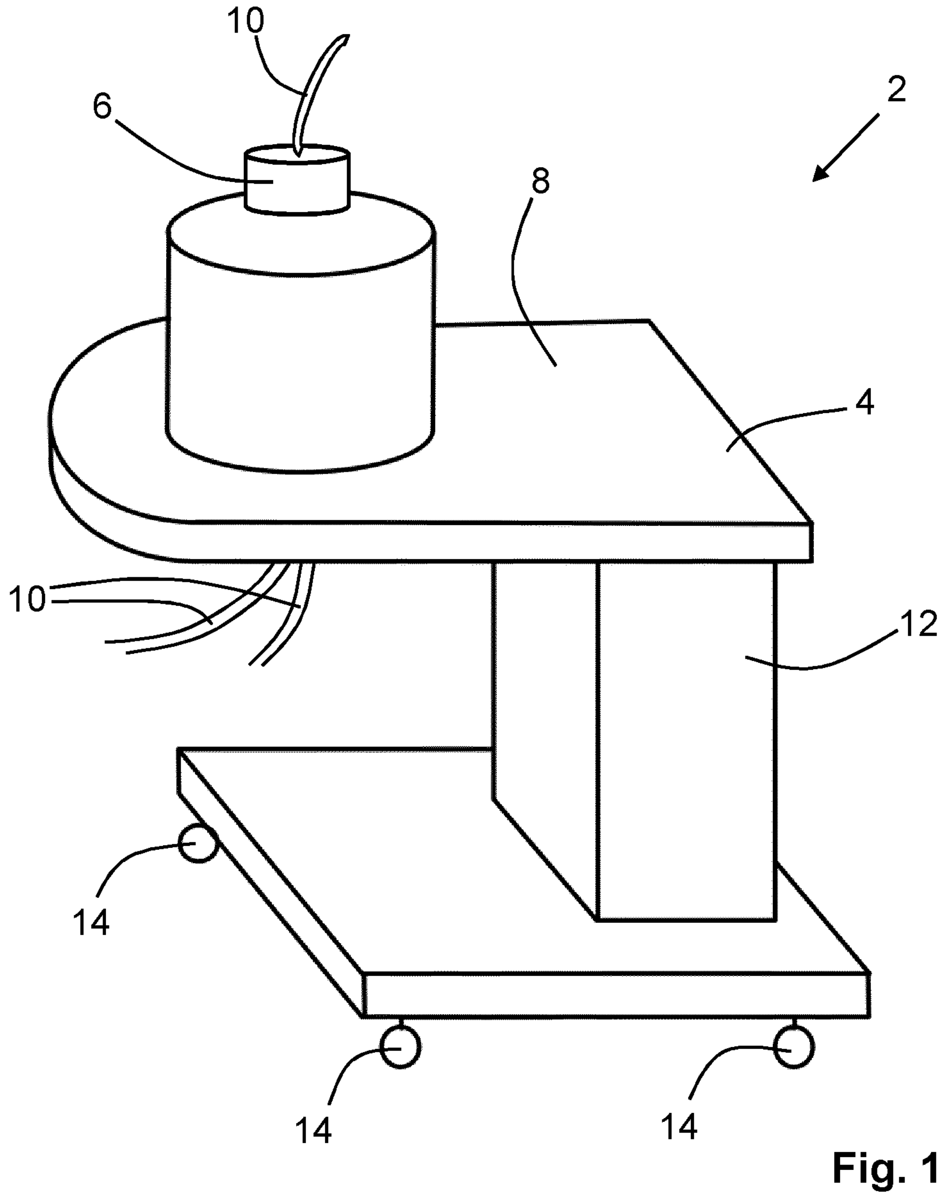
FIG. 1 schematically illustrates a modular centrifugal separator according to embodiments, FIG. 2 schematically illustrates a cross section through the base unit of the modular centrifugal separator of FIG. 1, FIG. 3 schematically illustrates a cross-section through an exchangeable separation insert according to embodiments, FIG. 4 schematically illustrates a cross section through a portion of a modular centrifugal separator, and FIG. 5 schematically illustrates a system for separating a cell culture mixture.

FIG. 1 schematically illustrates a modular centrifugal separator 2 according to embodiments. The modular centrifugal separator 2 comprises a base unit 4 and an exchangeable separation insert 6. The modular centrifugal separator 2 may be configured for use in the field of pharmaceuticals, biopharmaceuticals, and/or biotechnology. The modular centrifugal separator 2 may form part of a set-up in a plant for the production of cells, such as CHO cells (Chinese Hamster Ovary cells) or other matter resulting from processes in the biotech industry. The modular centrifugal separator 2 may form part of a system for separating a cell culture mixture as discussed below with reference to FIG. 5.

The modular centrifugal separator 2 is configured for separating a liquid feed mixture into a heavy phase and a light phase. For instance, the liquid feed mixture may be formed by a fermentation broth including a cell culture, the heavy phase may comprise the cells separated from the main part of the fermentation broth. The light phase may be formed by the main part of the fermentation broth without the cells or with only a minimal rest amount of cells.

The modular centrifugal separator 2 is modular in the sense that it comprises the base unit 4 and the exchangeable separation insert 6. The exchangeable separation insert 6 is exchanged for each new batch of liquid feed mixture, which is to be separated. Alternatively, the exchangeable separation insert 6 may be exchanged for each new type of liquid feed mixture, which is to be separated, i.e. subsequent batches containing same type of liquid feed mixtures may be separated with the same exchangeable separation insert 6.

During use of the modular centrifugal separator 2 the liquid feed mixture, the heavy phase, and the light phase only come into contact with the exchangeable separation insert 6 of the modular centrifugal separator 2. Naturally, conduits in the form of tubes 10 configured for conducting the liquid feed mixture to the exchangeable separation insert 6 and for conducting the heavy phase and the light phase from the exchangeable separation insert 6 also come into contact with the liquid feed mixture and the heavy and light phases. The tubes 10 may form part of the exchangeable separation insert 6. The base unit 4 does not come into contact with the liquid feed mixture or any of the heavy and light phases.

The exchangeable separation insert 6 is further discussed below with reference to FIG. 3.

The base unit 4 comprises components for supporting and rotating the exchangeable separation insert. Thus, the base unit 4 comprises inter alia a stationary frame 8, a rotatable member, and a drive unit for rotating the rotatable member. The stationary frame 8 comprises a vertical member 12. Part of the drive unit may be arranged in the vertical member 12.

The stationary frame 8 is stationary during use of the modular centrifugal separator. However, the base unit 4 as such may be movable, e.g. in order to be positioned at different locations at a production facility of the user. For this purpose, the stationary frame 8 may be provided with wheels 14.

The base unit 4 is further discussed below with reference to FIG. 2

Figure 2:
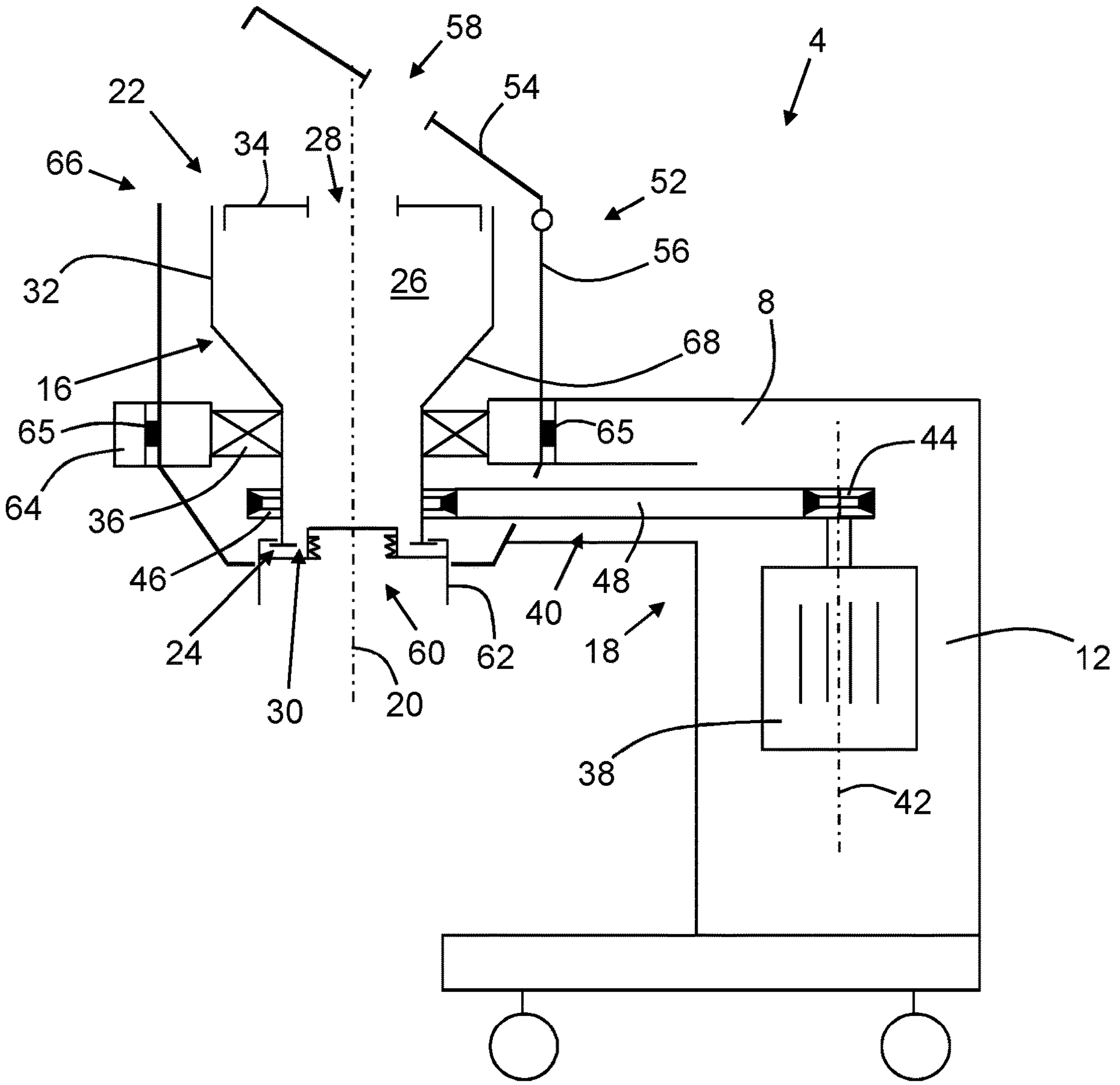

FIG. 2 schematically illustrates a cross section through the base unit 4 of the modular centrifugal separator 2 of FIG. 1. That is, in FIG. 2 the exchangeable separation insert has been omitted.

As mentioned above, the base unit 4 comprises the stationary frame 8, the rotatable member 16, and the drive unit 18. The rotatable member 16 is arranged in the stationary frame 8 and is configured to rotate about an axis 20 of rotation. The drive unit 18 is configured for rotating the rotatable member 16 about the axis 20 of rotation.

Seen along the axis 20 of rotation, the rotatable member 16 has a first axial end 22 and a second axial end 24. The rotatable member 16 delimits an inner space 26 at least in a radial direction. The radial direction extends perpendicularly to the axis 20 of rotation. The inner space 26 is configured for receiving at least one part of the exchangeable separation insert 6 therein, see further below with reference to FIGS. 3 and 4. Consequently, portions of the rotatable member 16 delimiting the inner space 26 are fully separate from the liquid feed mixture, and the separated heavy and light phases during use of the modular centrifugal separator.

Thus, the portions of the rotatable member delimiting the inner space 26, i.e. inter alia inner surfaces of the rotatable member 16, are dry during use of the modular centrifugal separator.

The rotatable member 16 is provided with a first opening 28 at the first axial end 22. The rotatable member 16 is further provided with a second opening 30 at the second axial end 24. Each of the first and second openings 28, 30 forms a through hole in the rotatable member 16. Thus, the inner space 26 is accessible via each of the first and second openings 28, 30. Accordingly, the first and second openings 28, 30 are configured for fluid connections of the exchangeable separation insert to extend therethrough. See further below with reference to FIGS. 3 and 4.

Accordingly, neither the rotatable member 16 as such, nor any other part of the base unit 4 comprises any fluid connections for the liquid feed mixture, and the heavy and light phases. Put differently, the base unit 4 is connectionless with respect to liquid feed mixture, and the heavy and light phases. Such connections are included in the assembled modular centrifugal separator including the base unit 4 and an exchangeable separation insert.

In these embodiments, the rotatable member 16 comprises a rotor body 32 and a cap 34. The cap 34 is releasably engaged with the rotor body 32. The cap 34 may for instance be releasably engaged with the rotor body 32 by means of threads, a bayonet coupling, screws, wingnuts, or any other suitable engagement arrangement. When the cap 34 is released from the rotor body 32, access to the inner space 26 is provided. When access to the inner space 26 is provided, an exchangeable separation insert may be mounted in the inner space 26. Similarly, when access to the inner space 26 is provided, an exchangeable separation insert may be removed from the inner space 26. Thus, a used exchangeable separation insert may be replaced with a new exchangeable separation insert when the cap 34 has been released from the rotor body 32.

The cap 34 may be arranged in a region of the first axial end 22 of the rotor body 32.

Accordingly, the first opening 28 of the rotatable member 16 is arranged in the cap 34. As mentioned above, a fluid connection of the exchangeable separation insert may extend through the first opening 28.

The base unit 4 comprises at least one bearing 36. The rotatable member 16 is journalled in the stationary frame 8 via the at least one bearing 36. Accordingly, the rotatable member 16 as such is journalled in the stationary frame 8. Also, the rotatable member 16 may be supported in the stationary frame 8 via the at least one bearing 36. Accordingly, the rotatable member 16 is not indirect journalled via a spindle or shaft as in prior art centrifugal separators comprising an exchangeable separation insert.

The at least one bearing 36 may be for instance one single ball bearing which supports both radial and axial forces. Alternatively, the at least one bearing 36 may comprise e.g. two bearings, for instance one which primarily supports radial forces and one which primarily supports axial forces.

The at least one bearing 36 is arranged at an axial position along the axis 20 of rotation such that the at least one bearing 36 extends around a portion of the inner space 26 delimited by the rotatable member 16. Since during use of the modular centrifugal separator the exchangeable separation insert is arranged in the inner space 26, the rotatable member 16 is supported in an axial position where the exchangeable separation insert also is positioned. Thus, the at least one bearing 36 provides reliable support of the rotatable member 16.

According to some embodiments, the at least one bearing 36 may have an inner diameter of at least 80 mm. In this manner, the at least one bearing 36 is sized such that a portion of the rotatable member 16 where it delimits the inner space 26 may fit within the at least one bearing 36. Also, in this manner, the at least one bearing 36 is sized such that, seen along the axis 20 of the rotational, the second opening 30 of the rotatable member 16 may fit within the at least one bearing 36. According to some embodiments, the at least one bearing 36 may have an inner diameter within a range of 80-150 mm. According to one non-limiting example the at least one bearing 36 may have an inner diameter of approximately 120 mm. Such large bearings are not common in centrifugal separators, in particular not in centrifugal separators having separation discs of the size discussed below. Since the bearing 36 is arranged as described above in the base unit 4, the large bearing 36 inter alia permits part of the exchangeable separation insert to fit within the at least one bearing 36.

The drive unit 18 comprises an electric motor 38, and a transmission 40 arranged between the electric motor 38 and the rotatable member 16. The transmission 40 provides for the electric motor 38 to be arranged beside the rotatable member 16. That is, an axis 42 of rotation of the electric motor 38 extends substantially in parallel with the axis 20 of rotation of the rotatable member 16. Since the electric motor 38 is arranged beside the rotatable member 16, access inter alia to both the first and second axial ends 22, 24 of the rotatable member 16 may be provided. That is, access to neither of the first and second axial ends 22, 24 is blocked by the electric motor 38.

In these embodiments, the transmission 40 is a belt drive comprising a first pulley 44 arranged on the electric motor 38, a second pulley 46 arranged on the rotatable member 16, and a belt 48 extending between the first and second pullies 44, 46. Alternatively, the transmission may be a gear transmission comprising cog wheels, or any other suitable transmission for transferring torque from the electric motor 38 to the rotatable member 16.

In these embodiments, the stationary frame 8 comprises a vertical member 12. The electric motor 38 is arranged at least partially inside the vertical member 12. In this manner, the electric motor 38 is protectively arranged within the stationary frame 8. A user of the modular centrifugal separator will not risk coming into contact with rotating parts of, or at, the electric motor 38. Similarly, the belt 48 may be arranged at least partly inside the stationary frame 8 in order to prevent a user of the modular centrifugal separator from coming into contact therewith.

The stationary frame 8 comprises a housing 52. The rotatable member 16 is arranged inside the housing 52. The housing 52 comprises a lid 54, which is pivotably or removably connected to a first housing portion 56 of the housing 52. The lid 54 is provided with a third opening 58. The third opening 58 forms a through hole in the lid 54.

In an open position of the lid 54, access is provided to the rotatable member 16 inside the housing 52, e.g. for exchange of the exchangeable separation insert. Thus, in order to remove and/or position an exchangeable separation insert inside the rotatable member 16, the lid 54 is moved to its open position and the cap 34 of the rotatable member 16 is released from the rotor body 32. Once the exchangeable separation insert has been positioned inside the inner space 26 of the rotatable member 16, the cap 34 is again engaged with the rotor body 32. Thereafter, the lid 54 is moved to a closed position.

In the closed position of the lid 54 the third opening 58 is configured for a fluid connection of the exchangeable separation insert to extend therethrough. During use of the modular centrifugal separator the lid the 54 is arranged in its closed position. Thus, the rotatable member 16 cannot be accessed by a user of the modular centrifugal separator. The third opening 58 provides for one of the fluid connections of the exchangeable separation insert to extend therethrough and permit fluid to pass to, or pass from, the exchangeable separation insert at the first axial end 22 of the rotatable member 16.

A fourth opening 60 is provided opposite to the lid 54. The fourth opening 60 is configured for a further fluid connection of the exchangeable separation insert to extend therethrough. Thus, the further fluid connection may extend from the housing 52 at the second axial end 24 of the rotatable member 16.

The fourth opening 60 may be provided in the housing 52, and/or in the stationary frame 8, and/or in an engagement member 62 arranged at the second axial end 24. In any case, the fourth opening 60 forms a through hole thus, permitting the further fluid connection of the exchangeable separation insert to extend therethrough.

In these embodiments, the base unit 4 comprises an engagement member 62. The engagement member 62 is arranged at the fourth opening 60. The engagement member 62 is configured to engage with a portion of the exchangeable separation insert, see further below with reference to FIG. 4.

The stationary frame 8 comprises a protruding member 64. The housing 52 is connected to the protruding member 64. Thus, access is provided to the housing 52 and also to the rotatable member 16 arranged in the housing 52. The housing 52 is connected to the protruding member 64 such that access is provided at least to one end 66 of the housing 52 along the axis 20 of rotation. Suitably, the housing 52 is connected to the protruding member 64 in a manner such that access is provided to that end of the housing 52 where the lid 54 is arranged. Thus, a user may access an inside of the housing 52, e.g. for exchanging the exchangeable separation insert in the rotatable member. Moreover, if access is provided at opposite ends of the housing 52 along the axis 20 of rotation, the user will be able to install the first and second fluid connections of the exchangeable separation insert through the first, second, third, and fourth openings 28, 30, 58, 60.

The rotatable member 16 is journalled inside the housing 52 of the stationary frame 8. That is the bearing 36 in which the rotatable member 16 is journalled is arranged within the housing 52.

According to some embodiments, the housing 52 may be suspended in the protruding member 64 via at least one resilient connector 65. In this manner, the housing 52 may form a dynamical system together with the rotatable member 16 and a rotor casing of the exchangeable separation insert. Thus, the journaling of the rotatable member 16 in the housing 52 as well as connections between the housing 52 and the remainder of the frame 8 are affected to a lesser degree than if the housing would be fixedly attached to the protruding member 64, when the rotatable member 16 together with the rotor casing passes the critical speed during operation of the modular centrifugal separator.

The resilient connector 65 may for instance be made from natural or synthetic rubber.

The rotatable member 16 comprises a frustoconical wall member 68 having an imaginary apex in a region of the second axial end 24. The frustoconical wall member 68 delimits a portion of the inner space 26. When positioned in the inner space 26, an exchangeable separation insert having a conical or frustoconical shape is supported by the frustoconical wall member 68. The frustoconical wall member 68 forms part of the rotor body 32.

Figure 3:
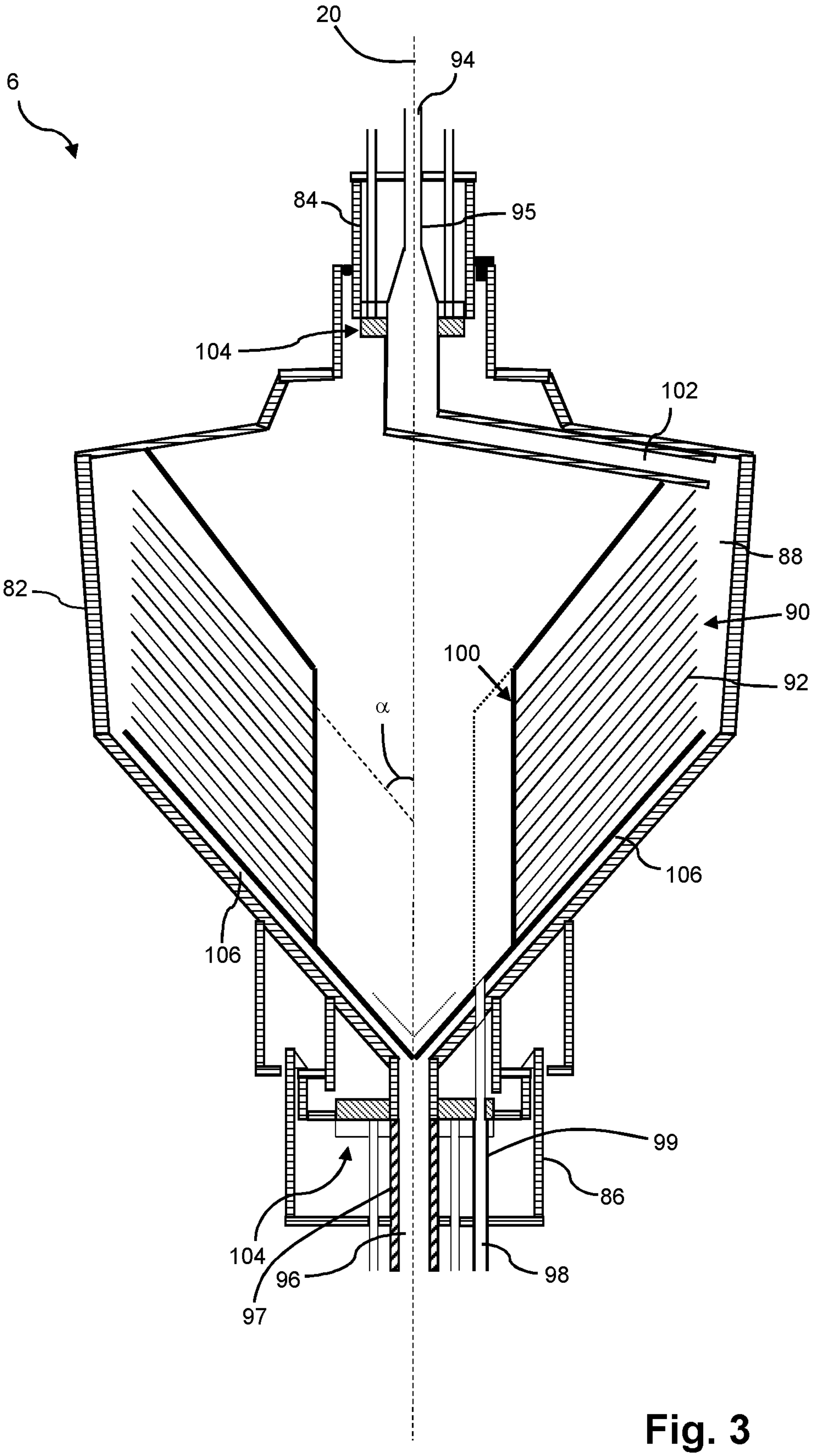

FIG. 3 schematically illustrates a cross-section through an exchangeable separation insert 6 according to embodiments. The exchangeable separation insert 6 may form part of a modular centrifugal separator, such as the modular centrifugal separator 2 discussed above in connection with FIG. 1. Accordingly, the exchangeable separation insert 6 may be configured for part of it to be arranged inside an inner space 26 of a rotatable member 16 discussed in connection with FIG. 2.

The exchangeable separation insert 6 comprises a rotor casing 82, a first stationary portion 84 and a second stationary portion 86. The exchangeable separation insert 6 is configured to rotate about an axis 20 of rotation. The rotor casing 82 is arranged between the first stationary portion 84 and the second stationary portion 86. During operation of the modular centrifugal separator, the first stationary portion 84 is arranged at an upper axial end of the exchangeable separation insert 6, whereas the second stationary portion 86 is arranged at a lower axial end of the exchangeable separation insert 6.

The rotor casing 82 delimits a separation space 88 therein. The exchangeable separation insert 6 comprises a stack 90 of frustoconical separation discs 92 arranged in the separation space 88. The separation discs 92 in the stack 90 are arranged with an imaginary apex at the second stationary portion 86, and/or pointing towards the second stationary portion 86. The stack 90 may comprise at least 50 separation discs 92, such as at least 100 separation discs 92, such as at least 150 separation discs 92. Mentioned as an example, a separation disc 92 may have an outer diameter within a range of 160-400 mm, an inner diameter within a range of 60-100 mm, and an angle α between the axis 20 of rotation and an inner surface of the disc 92 within a range of 35-45 degrees. For clarity reasons, only a few discs 92 are shown in FIG. 3.

The exchangeable separation insert 6 comprises a first fluid connection 94 arranged at the first stationary portion 84. A first conduit portion 95 forms part of the first fluid connection 94. The first conduit portion 95 of the first fluid connection 94 extends through the first stationary portion 84. The exchangeable separation insert 6 comprises a second fluid connection 96 arranged at the second stationary portion 86. A second conduit portion 97 forms part of the second fluid connection 96. The second conduit portion 97 of the second fluid connection 96 extends through the second stationary portion 86. In these embodiments, the exchangeable separation insert 6 comprises a third fluid connection 98 arranged at the second stationary portion 86. A third conduit portion 99 forms part of the third fluid connection 98. The third conduit portion 99 of the third fluid connection 98 extends through the second stationary portion 86.

In these embodiments, the first fluid connection 94 is configured for conducting the heavy phase from the rotor casing 82, the second fluid connection 96 is configured for conducting the liquid feed mixture to the rotor casing 82, and the third fluid connection 98 is configured for conducting in the light phase from the rotor casing 82. From the second fluid connection 96, the liquid feed mixture flows into the separation space 88 on the axis 20 of rotation. The liquid feed mixture is distributed from the axis 20 of rotation to an outer periphery of the separation space 88. The separated light phase flows towards the axis 20 of rotation and leaves the separation space 88 at a radial position between the axis 20 of rotation and the radially inner edges 100 of the separation discs 92.

Inside the rotor casing 82 there is arranged one or more outlet conduits 102 for the separated heavy phase from the separation space 88. The one or more outlet conduits 102 extend from a radially outer portion of the separation space 88 towards the axis 20 of rotation. The one or more outlet conduits 102 may each comprise a tube. Depending on the number of outlet conduits 102 and e.g. the density and/or viscosity of the heavy phase, each tube may have an inner diameter within a range of 2-10 mm. In this example, there is provided a single outlet conduit 102. However, there may be at least two such outlet conduits, such as at least three or such as at least five outlet conduits, evenly distributed over the circumference of the rotor casing 82. The outlet conduit 102 has a conduit inlet arranged at the radially outer portion and a conduit outlet at a radially inner portion. The outlet conduit 102 is arranged at an axially upper portion of the separation space 88.

The first stationary portion 84 abuts against the rotor casing 82. The second stationary portion 86 abuts against the rotor casing 82. Seals 104 are provided between the respective first and second stationary portions 84, 86 and the rotor casing 82. The seals 104 may form part of the stationary portions 84, 86 and/or of the rotor casing 82. In these embodiments, each of the seals 104 comprises rotating sealing surfaces forming part of the rotor casing 82 and stationary sealing surfaces forming part of the stationary portions 84, 86.

The seals 104 form mechanical seals between the stationary portions 84, 86 and the rotor casing 82. Thus, the exchangeable separation insert 6 is provided with mechanically hermetically sealed inlet and outlets. More specifically, a fluid connection between the outlet conduit 102 arranged inside the rotor casing 82 and the first conduit portion 95 arranged in the first stationary portion 84 is mechanically hermetically sealed. Similarly, a fluid connection between the second conduit portion 97 arranged in the second stationary portion 86 and the separation space 88 inside the rotor casing 82 is mechanically hermetically sealed. Also, a fluid connection between the separation space 88 inside the rotor casing 82 and the third conduit portion 99 arranged in the second stationary portion 86 is mechanically hermetically sealed.

It is remarked that a mechanical hermetical seal forms a completely different interface between rotating and stationary parts of the centrifugal separator than a hydraulic seal comprising e.g. a paring disc arranged inside a paring chamber. A mechanical hermetical seal includes an abutment between part of the rotatable rotor casing and a stationary portion.

A hydraulic seal does not include an abutment between the rotating and stationary parts of a centrifugal separator.

The first, second, and third fluid connections 94, 96, 98 may comprise tubing, such as plastic tubing.

During operation, the exchangeable separation insert 6, arranged in a rotatable member 16, is brought into rotation around the axis 20 of rotation. Liquid feed mixture to be separated is supplied via the second fluid connection 96 arranged in the second stationary portion 86 and guiding channels 106 into the separation space 88. The liquid feed mixture to be separated is guided along an axially upwardly path into the separation space 88. Due to a density difference the liquid feed mixture is separated into a liquid light phase and a liquid heavy phase. This separation is facilitated by the interspaces between the separation discs 92 of the stack 90 fitted in the separation space 88. The heavy phase may comprise particles, such as e.g. cells. The heavy phase may comprise a concentrated mixture of light phase and particles.

The separated liquid heavy phase is collected from the periphery of the separation space 88 via outlet conduit 102 and is forced out of the rotor casing 82 to the first fluid connection 94 arranged in the first stationary portion 84. Separated liquid light phase is forced radially inwardly through the stack 90 of separation discs 92 and led out of the rotor casing 82 to the third fluid connection 98 arranged in the second stationary portion 86. Consequently, in this embodiment, the liquid feed mixture is supplied at a lower axial end of the exchangeable separation insert 6, the separated light phase is discharged at the lower axial end, and the separated heavy phase is discharged at the upper axial end of the exchangeable separation insert 6.

As is apparent from the above discussion of the exchangeable separation insert 6, it is devised for being in contact with the liquid feed mixture, and the separated heavy and light phases during use of the modular centrifugal separator.

Figure 4:
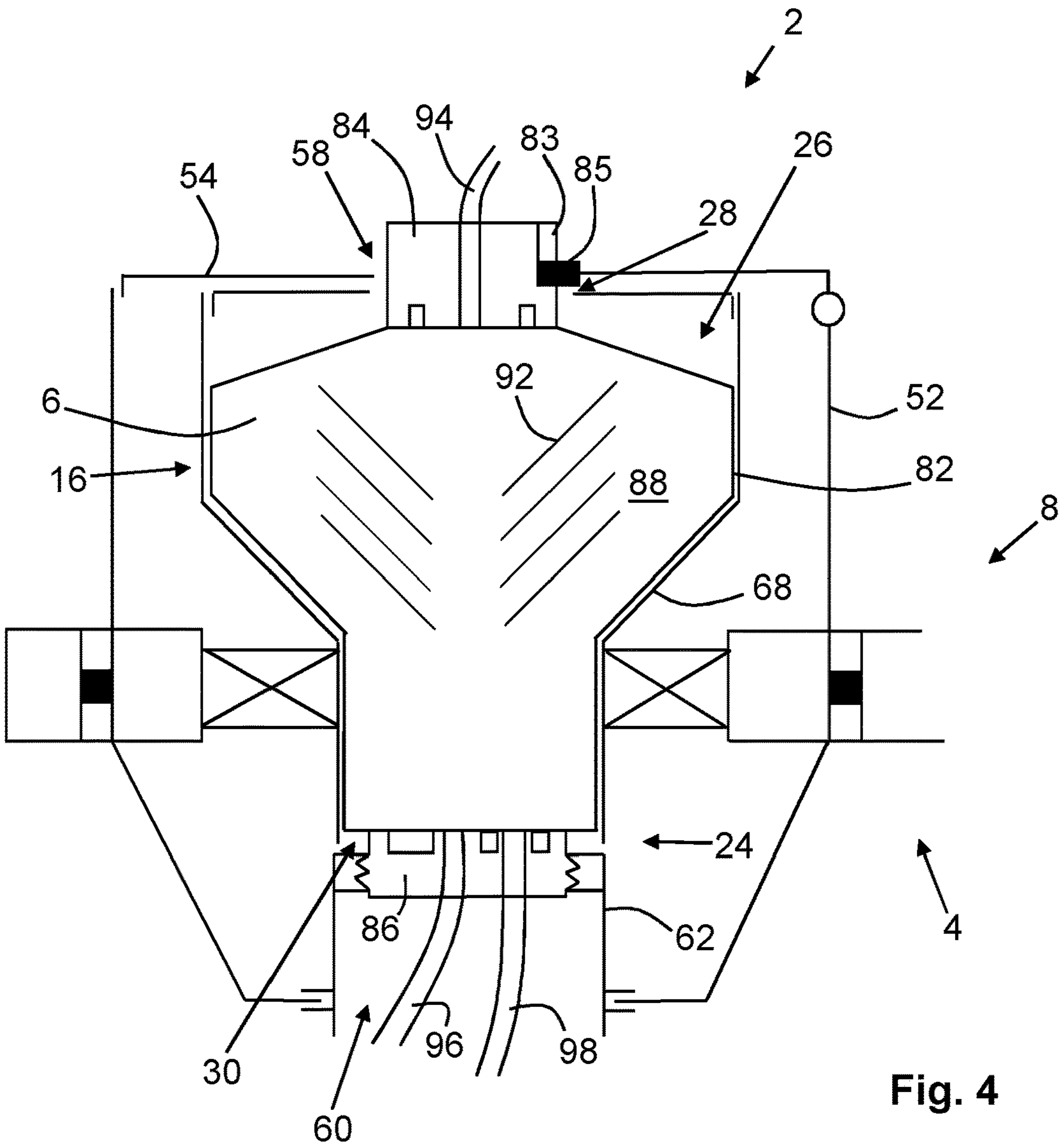

FIG. 4 schematically illustrates a cross section through a portion of a modular centrifugal separator 2. More specifically, FIG. 4 shows a cross section through a housing 52, a rotatable member 16, and an exchangeable separation insert 6 of the modular centrifugal separator 2. The modular centrifugal separator 2 may be a modular centrifugal separator 2 as discussed above in connection with FIGS. 1 and 2. The exchangeable separation insert 6 may be an exchangeable separation insert 6 as discussed above in connection with FIG. 3. Accordingly, in the following, reference is also made to FIGS. 1-3.

In FIG. 4 the exchangeable separation insert 6 is shown mounted in the base unit 4. Part of the exchangeable separation insert 6 is received in the inner space 26 of the rotatable member 16. More specifically, the rotor casing 82 of the exchangeable separation insert 6 is secured in the inner space 26 of the rotatable member 16 with the first fluid connection 94 of the exchangeable separation insert 6 extending through the first opening 28 of the rotatable member 16 and the second fluid connection 96 of the exchangeable separation insert 6 extending through the second opening 30 of the rotatable member 16.

In these embodiments, also the third fluid connection 98 extends through the second opening 30.

At least part of the first stationary portion 84 may also extend through the first opening 28. At least part of the second stationary portion 86 may also extend through the second opening 30.

The first and second openings 28, 30 at opposite axial ends of the rotatable member 16 provide for easy mounting of the exchangeable separation insert 6 in the rotatable member 16 with the first and second fluid connections 94, 96 extending through respective of the first and second openings 28, 30.

The fluid connections 94, 96, 98 of the exchangeable separation insert 6 extend out of the housing 52. The first fluid connection 94 extends through the third opening 58 of the housing 52. Also, at least part of the first stationary portion may extend through the third opening 58. The second fluid connection 96 extends through a fourth opening 60. As mentioned above, the fourth opening 60 may be provided in the housing 52, or alternatively, in a different portion of the stationary frame 8 of the modular centrifugal separator 2. In these embodiments, also the third fluid connection 98 extends through the fourth opening 60.

As mentioned above in connection with FIG. 2, the third opening 58 may be provided in a lid 54 of the housing 52. The lid 54 is configured to engage with a portion of the exchangeable separation insert 6. More specifically, the lid 54 is configured to engage with the first stationary portion 84. Thus, the first stationary portion 84 may be fixed in relation to the stationary frame 8 during use of the modular centrifugal separator 2. The first stationary portion 84 is maintained in a predefined position during use of the modular centrifugal separator. Accordingly, also the first fluid connection 94 is rotationally fixed during use of the modular centrifugal separator 2.

The purpose of the engagement between the lid 54 and the first stationary portion 84 is to prevent the first stationary portion 84 from rotating during use of the modular centrifugal separator 2. Moreover, the engagement between the lid 54 and the first stationary portion 84 may contribute to positioning the exchangeable separation insert 6 in a correct axial position. For instance, when the lid 54 is engaged with the first stationary portion 84, the first stationary portion 84 is pressed against the rotor casing 82 such that the seals within the exchangeable separation insert 6 provide their intended sealing function.

The lid 54 may engage with the first stationary portion 84 in a number of different ways. For instance, the first stationary portion 84 may be provided with a radial recess 83 and the lid 54 may be provided with a protrusion 85 extending into the radial recess 83. Alternatively, or additionally, e.g. the first stationary portion 84 may be provided with an axial flange and the lid 54 may abut against the axial flange.

As mentioned above in connection with FIG. 2, an engagement member 62 is arranged at the fourth opening 60. The engagement member 62 is configured to engage with a portion of the exchangeable separation insert 6. More specifically, the engagement member 62 is configured to engage with the second stationary portion 86 of the exchangeable separation insert 6.

When engaged with the second stationary portion 86, the engagement member 62 and the second stationary portion 86 are fixed in relation to the stationary frame 8.

The engagement member 62 may for instance comprise inner threads and the second stationary portion 86 may comprise outer threads. Thus, the engagement member 62 may be threadedly engaged with the second stationary portion 86. According to alternative embodiments, a bayonet coupling may be provided between the engagement member 62 and the second stationary portion 86.

The rotatable member 16 comprises a frustoconical wall member 68 having an imaginary apex in a region of the second end 24 of the rotatable member 16. A portion of the exchangeable separation insert 6 has a conical or frustoconical shape. The conical or frustoconical portion of the exchangeable separation insert 6 is supported by the frustoconical wall member 68. The conical or frustoconical portion of the exchangeable separation insert 6 may be derived from the frustoconical shape of the separation discs 92 arranged in the separation space 88 of the rotor casing 82.

As is apparent from the above discussion of the modular centrifugal separator 2, it is devised such that only the exchangeable separation insert 6 is in contact with the liquid feed mixture, and the separated heavy and light phases during use of the modular centrifugal separator 2. The base unit 4 of the modular centrifugal separator 2 is void of contact with any of the liquid feed mixture, and the separated heavy and light phases during use of the modular centrifugal separator 2.

Figure 5:
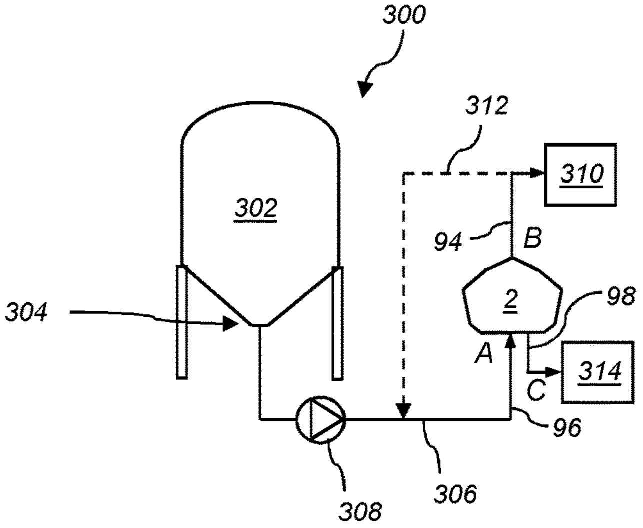

FIG. 5 schematically illustrates a system 300 for separating a cell culture mixture. The system 300 comprises a fermenter tank 302 in which a cell culture mixture is produced. The fermenter tank 302 has an axially upper portion and an axially lower portion 304. The fermentation may for example be for expression of an extracellular biomolecule, such as an antibody, from a mammalian cell culture mixture. In other processes the cells of the cell culture mixture may be, or may contain, the sought-after substance from the fermentation in the fermenter tank 302.

After fermentation, the cell culture mixture is separated in a modular centrifugal separator 2 according to any one of aspects and/or embodiments discussed herein, see e.g. FIGS. 1-4. As seen in FIG. 5, a bottom portion of the fermenter tank 302 is connected via a conduit connection 306 to the modular centrifugal separator 2.

Thus, according to some embodiments, the system 300 may comprise a conduit connection 306 extending between the fermenter tank 302 and the modular centrifugal separator 2. The conduit connection 306 may comprise the second fluid connection 96. That is, part of the conduit connection 306 may be formed by the second fluid connection 96 of the exchangeable separation insert 6 of the modular centrifugal separator 2. In this manner, when the exchangeable separation insert 6 is provided as a sterile entity, at least part of the conduit connection 306 is sterile.

The conduit connection 306 may be a direct connection between the fermenter tank 302 and the modular centrifugal separator 2 as shown in FIG. 5, or a connection via other processing equipment, such as a tank.

According to some embodiments, the system 300 may comprise a pump 308 arranged in the conduit connection 306. In this manner, the pump 308 may be utilised for transporting the cell culture mixture to the modular centrifugal separator 2.

The conduit connection 306 allows for supply of the cell culture mixture from the axially lower portion 304 of the fermenter tank 302 to an inlet of the modular centrifugal separator 2, as indicated at "A". After separation, the separated cell phase of higher density is discharged via a heavy phase outlet at the top of the modular centrifugal separator 2, as indicated at "B", whereas the separated liquid light phase of lower density, which may comprise an expressed biomolecule, is discharged via a light phase outlet of the modular centrifugal separator 2, as indicated at "C".

According to some embodiments, the system 300 may comprise a first receiving container 310 connected to the first fluid connection 94 of the exchangeable separation insert 6 of the modular centrifugal separator 2. In this manner, when the exchangeable separation insert 6 is provided as a sterile entity, at least part of the connection to the first receiving container 310 is sterile.

Thus, the separated cell phase may be discharged to the first receiving container 310. The separated cell phase may in some process be re-used in a subsequent fermentation process, e.g. in the fermenter tank 302.

The separated cell phase may be recirculated to the feed inlet of the modular centrifugal separator 2, as schematically indicated by connection 312.

The separated liquid light phase may be discharged to a second receiving container 314 or directly to further process equipment e.g. for subsequent purification of the expressed biomolecule. The separated liquid light phase leaves the modular centrifugal separator 2 via the third fluid connection 98 of the exchangeable separation insert 6 of the modular centrifugal separator 2.

The production of the cell culture mixture and the separation of the cell culture mixture are performed under sterile conditions. As has already been discussed, the exchangeable separation insert 6 of the modular centrifugal separator 2 may be provided a sterile entity. The conduits 10 for conducting the liquid feed mixture and the separated heavy and light phases, see FIG. 1, i.e. the fluid connections 94, 96, 98, see also FIGS. 3 and 4, may form part of the exchangeable separation insert 6, and thus, are also sterile on their insides.

The fermenter tank 302, the first receiving container 310, and the second receiving container 314 are internally sterile. One option may be to provide the fermenter tank 302, the first receiving container 310, and the second receiving container 314 as single use containers. That is, they are used for one batch or a limited number of batches before being discarded and exchanged for the production of a new batch of cell culture mixture. The single use containers may be units having their own supporting structure. Alternatively, the single use containers may be mounted on or inside dedicated supporting structures. Conduits connected to the fermenter tank 302, the first receiving container 310, and the second receiving container 314 may form part of the single use containers.

Accordingly, the parts of the system 300 in contact with the cell culture mixture, the separated cell phase, and the separated liquid light phase may all form single use parts which are provided as sterilised parts. Thus, after production and separation of a batch of cell culture mixture, all single use parts may be removed from the system 300 and replaced with new, sterile, single use parts. Hence, no sterilisation of any multiple use parts of the system are required and the production facility of a producer of the cell culture mixture is simplified.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A base unit of a modular centrifugal separator configured for separating a liquid feed mixture into a heavy phase and a light phase, the modular centrifugal separator comprising the base unit and an exchangeable separation insert, the exchangeable separation insert being configured to form the only part of the modular centrifugal separator, which is in contact with the liquid feed mixture, and the separated heavy and light phases, wherein the base unit comprises a stationary frame, a rotatable member configured to rotate about an axis of rotation arranged in the stationary frame, and a driver for rotating the rotatable member about the axis of rotation, wherein the rotatable member has a first axial end and a second axial end, and delimits an inner space at least in a radial direction, the inner space being configured for receiving at least one part of the exchangeable separation insert therein such that portions of the rotatable member delimiting the inner space are fully separate from the liquid feed mixture, and the separated heavy and light phases during use of the modular centrifugal separator, wherein the rotatable member is provided with a first opening at the first axial end configured for a first fluid connection of the exchangeable separation insert to extend through the first opening, wherein the rotatable member comprises a second opening at the second axial end configured for a second fluid connection of the exchangeable separation insert to extend through the second opening, wherein the stationary frame comprises a housing, and wherein at least one bearing extends between a sidewall of the housing and a sidewall of the rotatable member.

2. The base unit according to claim 1, wherein the rotatable member is journaled in the stationary frame via the at least one bearing.

3. A base unit of a modular centrifugal separator configured for separating a liquid feed mixture into a heavy phase and a light phase, the modular centrifugal separator comprising the base unit and an exchangeable separation insert, the exchangeable separation insert being configured to form the only part of the modular centrifugal separator, which is in contact with the liquid feed mixture, and the separated heavy and light phases, wherein the base unit comprises a stationary frame, a rotatable member configured to rotate about an axis of rotation arranged in the stationary frame, a driver for rotating the rotatable member about the axis of rotation, and at least one bearing, wherein the rotatable member has a first axial end and a second axial end, and delimits an inner space at least in a radial direction, the inner space being configured for receiving at least one part of the exchangeable separation insert therein such that portions of the rotatable member delimiting the inner space are fully separate from the liquid feed mixture, and the separated heavy and light phases during use of the modular centrifugal separator, wherein the rotatable member is provided with a first opening at the first axial end configured for a first fluid connection of the exchangeable separation insert to extend through the first opening, wherein the rotatable member comprises a second opening at the second axial end configured for a second fluid connection of the exchangeable separation insert to extend through the second opening, wherein the rotatable member is journalled in the stationary frame via the at least one bearing, and wherein the at least one bearing is arranged at an axial position along the axis of rotation such that the at least one bearing extends around a portion of the inner space delimited by the rotatable member.

4. The base unit according to claim 1, wherein the rotatable member comprises a frustoconical wall member having an imaginary apex in a region of the second end.

5. The base unit according to claim 1, wherein the rotatable member comprises a rotor body and a cap, wherein the first opening is arranged in the cap, and wherein the cap is releasably engaged with the rotor body for providing access to the inner space and mounting of the exchangeable separation insert.

6. The base unit according to claim 1, wherein the rotatable member is arranged inside the housing, wherein the housing comprises a lid provided with a third opening, wherein in an open position of the lid access is provided to the rotatable member for exchange of the exchangeable separation insert, and wherein in a closed position of the lid the third opening is configured for the first fluid connection of the exchangeable separation insert to extend therethrough.

7. The base unit according to claim 6, wherein the lid is configured to engage with a portion of the exchangeable separation insert.

8. The base unit according to claim 7, wherein the stationary frame is provided with a fourth opening opposite to the lid, and wherein the fourth opening is configured for the second fluid connection of the exchangeable separation insert to extend therethrough.

9. The base unit according to claim 8, comprising an engagement member arranged at the fourth opening, wherein the engagement member is configured to engage with a portion of the exchangeable separation insert.

10. The base unit according to claim 6, wherein the stationary frame comprises a protruding member, and wherein the housing is connected to the protruding member such that access is provided at least to one end of the housing along the axis of rotation.

11. The base unit according to claim 10, wherein the housing is suspended in the protruding member via at least one resilient connector.

12. The base unit according to claim 1, wherein the driver comprises an electric motor, and a transmission arranged between the electric motor and the rotatable member.

13. The base unit according to claim 12, wherein the stationary frame comprises a vertical member, and wherein the electric motor is arranged at least partially inside the vertical member.

14. A modular centrifugal separator configured for separating a liquid feed mixture into a heavy phase and a light phase, the modular centrifugal separator comprising the base unit and the exchangeable separation insert of claim 3, wherein the exchangeable separation insert comprises a rotor casing forming a separation space, frustoconical separation discs arranged in the separation space, and fluid connections for the liquid feed mixture, the heavy phase and the light phase, the exchangeable separation insert being configured to form the only part of the modular centrifugal separator, which is in contact with the liquid feed mixture, and the separated heavy and light phases.

15. The modular centrifugal separator according to claim 14, wherein the rotor casing of the exchangeable separation insert is secured in the inner space of the rotatable member with a first fluid connection of the exchangeable separation insert extending through the first opening of the rotatable member and a second fluid connection of the exchangeable separation insert extending through the second opening of the rotatable member.

16. A system for separating a cell culture mixture, comprising a fermenter tank, the modular centrifugal separator according to claim 15, and a conduit connection extending between the fermenter tank and the modular centrifugal separator, wherein the conduit connection comprises the second fluid connection.

17. The system according to claim 16, comprising a pump arranged in the conduit connection.

18. The system according to claim 16, comprising a first receiving container connected to the first fluid connection of the modular centrifugal separator.

19. The base unit according to claim 2, wherein the rotatable member comprises a frustoconical wall member having an imaginary apex in a region of the second end.

* * * * *